(No Model.)

O. SCHLEICHER.
FEED WATER UTILIZING DEVICE.

No. 510,615. Patented Dec. 12, 1893.

Witnesses:
H. G. Dieterich
M. J. L. Higgins

Inventor:
Otto Schleicher
By Henry Orth
Atty.

UNITED STATES PATENT OFFICE.

OTTO SCHLEICHER, OF MAGDEBURG, GERMANY.

FEED-WATER-UTILIZING DEVICE.

SPECIFICATION forming part of Letters Patent No. 510,615, dated December 12, 1893.

Application filed March 2, 1893. Serial No. 464,339. (No model.) Patented in Germany June 10, 1891, No. 64,134.

*To all whom it may concern:*

Be it known that I, OTTO SCHLEICHER, a subject of the German Emperor, residing at 14 Pfälzerstrasse, Magdeburg, Germany, have invented a certain new and useful Feed-Water-Utilizing Device, (for which Letters Patent have been obtained in Germany under date of June 10, 1891, No. 64,134;) and I do hereby declare the following to be a full, clear, and exact description of the invention.

My invention has for its object the provision of means for utilizing the excess of feed water supplied by the feed pumps to a boiler or boilers, as a motive fluid for other machines, and it consists essentially in the combination with the feed water supply pipe, of a collector interposed in said pipe between the boiler and feed pump, and a connection between said collector and the chamber of the distributing organ of the auxiliary machine.

It further consists in the combination with the collector, of an air chamber for the purpose of compensating the pulsations of the feed pump or the column of feed water, and in the combination with the feed pipe or with an auxiliary pipe connecting the collector with the boiler, of a pressure regulating or pressure reducing valve, whereby the boiler pressure is made available as a forcing medium for the water in the collector, when the pump is going slow or is at a stand still.

Figure 1:
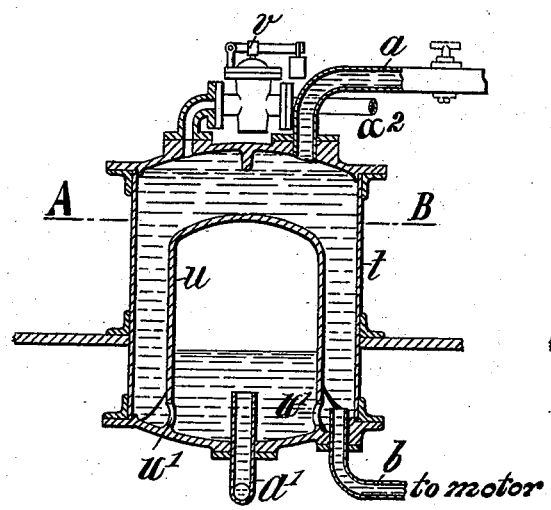
Figure 2:
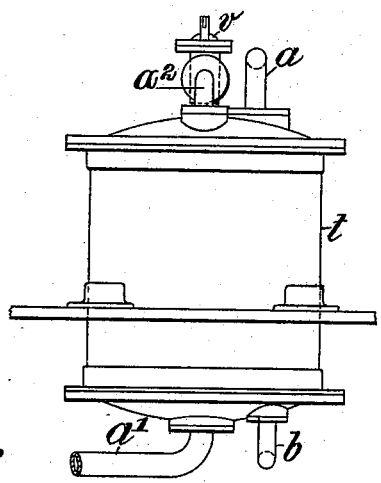
Figure 3:
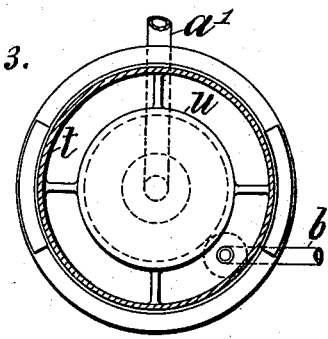
Figure 4:
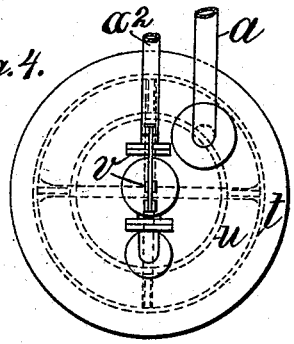

Referring to the accompanying drawings—Figure 1 is a vertical section; Fig. 2 an elevation; Fig. 3 a transverse section on line A—B, of Fig. 1, and Fig. 4 a top plan view of a collector embodying my invention.

As shown in the drawings, the collector $t$ consists of a cylindrical vessel connected by a pipe, $a'$, with the forcing or exhaust port of the feed pump driven by the primary engine, said pipe projecting centrally some distance into the collector, which is also connected with the boiler by a pipe $a$, leading from the upper end of said collector and with the valve chamber of the auxiliary engine or motor by a pipe, $b$, leading from the bottom thereof near its vertical wall.

In order to compensate the pulsations of the pump, or the entering column of water, I provide an air chamber, $u$, provided at or near its lower end with ports, $u'$, leading to the encompassing collector. So long as the feed pump is at work, the pressure within the collector and consequently in the auxiliary feed pipe, $b$, thereof, will be the same as in the boiler, but that the water in the collector may be utilized as motive fluid for an auxiliary engine or motor when the feed pump is working slowly or is at a stand still, I provide the collector or the pipe leading therefrom to the boiler with the pressure regulating valve, $v$, so adjusted as not to open until the water stored in the air chamber has passed out into the collector, and the pressure therein has, in consequence, been reduced below the pressure in the boiler, when the reduced boiler steam or water will exert pressure upon the water in the collector, $t$, so that the pressure of the water therein can be maintained to a degree determined by or within the limit of adjustment of the reducing valve. If the pressure reducing valve is interposed in a separate pipe, $a^2$, as shown, which may lead to the steam space of the boiler or to the water space thereof, if desired a suitable valve is provided for the pipe, $a$, as shown in dotted lines in Fig. 1, so that the communication between the boiler and collector through pipe, $a$, may be cut off. Whenever the supply of stored water in the collector is exhausted and it is desirable to keep the auxiliary engine or motor in operation while the feed pump is idle or while the boiler supply to the primary engine or motor is cut off, the auxiliary feed pumps can be started and a fresh supply of water stored in the collector. It will thus be seen that so long as the boiler supplies steam to the primary engine or motor the auxiliary engine can be supplied with water under the same pressure as that supplied to the boiler, that when the feed pump driven by the primary engine is stopped, the reduced boiler pressure can be made available to force the water in the collector to the auxiliary engine or motor and that when the water is exhausted from the collector and the supply of steam from the boiler to the primary engine or motor is cut off, a fresh supply of water is stored in the collector by the auxiliary feed pumps.

Having thus described my invention, what I claim as new therein, and desire to secure by Letters Patent, is—

1. Means for utilizing the feed water supplied to boilers for driving auxiliary engines, comprising a collector interposed in the feed water pipe, an eduction pipe connected with the collector, and means within the latter for compensating the pulsations due to the operation of the feed pump, for the purpose set forth.

2. Means for utilizing the feed water supplied to boilers for driving auxiliary engines, comprising a collector interposed in the feed water pipe, an eduction pipe connected with the collector, and means for admitting fluid under pressure from the boiler to the collector and its eduction pipe when the pump is slowing down or at a stand still, for the purpose set forth.

3. Means for utilizing the feed water supplied to boilers for driving auxiliary engines, comprising a collector interposed in the feed water pipe, an eduction pipe, as $b$, and an air chamber having ports at its lower end arranged centrally within the collector, for the purpose set forth.

4. Means for utilizing the feed water supplied to boilers for driving auxiliary engines, comprising a collector interposed in the feed water pipe, an eduction pipe, as $b$, an air chamber having ports at its lower end arranged centrally within the collector, and a pressure reducing valve between the collector and boiler, for the purpose set forth.

In testimony whereof I have hereunto affixed my signature in the presence of two witnesses.

OTTO SCHLEICHER.

Witnesses:
R. MEINERT,
D. PLIECK.